United States Patent
Druenert et al.

(10) Patent No.: US 7,846,603 B2
(45) Date of Patent: Dec. 7, 2010

(54) COOLANT RESERVOIR PURGE SYSTEM FOR FUEL CELL SYSTEMS AND VEHICLES

(75) Inventors: Volker Druenert, Russelsheim (DE); Uwe Hannesen, Bonneval (FR)

(73) Assignee: GM Global Technology Operations, Inc., Detroit, MI (US)

( * ) Notice: Subject to any disclaimer, the term of this patent is extended or adjusted under 35 U.S.C. 154(b) by 932 days.

(21) Appl. No.: 11/688,150

(22) Filed: Mar. 19, 2007

(65) Prior Publication Data
US 2008/0233448 A1 Sep. 25, 2008

(51) Int. Cl.
*H01M 8/04* (2006.01)
*H01M 8/12* (2006.01)

(52) U.S. Cl. ............... 429/437; 429/413; 429/434; 429/452

(58) Field of Classification Search .......... 429/400–535
See application file for complete search history.

(56) References Cited
U.S. PATENT DOCUMENTS

| | | | |
|---|---|---|---|
| 5,360,679 A * | 11/1994 | Buswell et al. | 429/414 |
| 6,635,374 B1 * | 10/2003 | Aramaki | 429/413 |
| 6,733,910 B1 * | 5/2004 | Kralick | 429/434 |
| 2003/0162066 A1 * | 8/2003 | Shiraishi et al. | 429/26 |
| 2005/0095473 A1 * | 5/2005 | Sakakida et al. | 429/20 |
| 2005/0252791 A1 * | 11/2005 | Pechtold et al. | 206/1.5 |
| 2007/0175894 A1 * | 8/2007 | Pechtold et al. | 220/203.01 |

* cited by examiner

*Primary Examiner*—Patrick Ryan
*Assistant Examiner*—Jonathan G Leong
(74) *Attorney, Agent, or Firm*—John A. Miller; Miller IP Group, PLC

(57) ABSTRACT

A fuel cell system that employs a technique for safely removing hydrogen gas that accumulates within a cooling fluid reservoir. The fuel cell system includes a fuel cell stack and a compressor for providing airflow to the cathode side of the fuel cell stack. The system also includes an air filter box having an air filter that is in fluid communication with an air pocket in the reservoir. The air intake to the compressor flows through the air filter box, and sucks the gas from the reservoir, which is then sent to the cathode side of the fuel cell stack to be converted to water by the electro-chemical reaction therein.

20 Claims, 2 Drawing Sheets

COOLANT RESERVOIR PURGE SYSTEM FOR FUEL CELL SYSTEMS AND VEHICLES

BACKGROUND OF THE INVENTION

1. Field of the Invention

This invention relates generally to a fuel cell system that employs a technique for removing hydrogen gas from a cooling fluid system and, more particularly, to a fuel cell system that employs an air filter box through which the cathode inlet air is drawn, where the air filter box is in gas communication with a cooling fluid reservoir so that hydrogen gas that is collected in the reservoir is drawn into the cathode side of the fuel cell stack.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack. The stack also includes flow channels through which a cooling fluid flows.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

Fuel cell systems employ thermal sub-systems that control the temperature within the fuel cell stack. Particularly, a cooling fluid is pumped through the cooling fluid flow channels in the bipolar plates in the stack. Known thermal sub-systems attempt to control the temperature of the cooling fluid being sent to the fuel cell stack and the temperature difference between the cooling fluid into the stack and the cooling fluid out of the stack, where the cooling fluid flow rate controls the temperature difference. The thermal sub-system typically includes a reservoir that provides a storage facility for cooling fluid loss and volume expansion as a result of temperature differences. Typically the cooling fluid is a liquid that inhibits corrosion within the stack, does not freeze in cold environments, and is non-conductive. It is necessary that the cooling fluid be non-conductive so that current does not travel across the cooling fluid channels in the stack. One example of a suitable cooling fluid is a de-ionized water and glycol mixture.

It is desirable that the distribution of hydrogen within the anode flow channels in the fuel cell stack be substantially constant for proper fuel cell stack operation. Therefore, it is known in the art to input more hydrogen into the fuel cell stack than is necessary for a certain output load of the stack so that the anode gas distribution is proper. However, not all of the hydrogen is consumed by the stack.

Hydrogen molecules are extremely small and are difficult to contain within an enclosed environment. It is known in the art that hydrogen can permeate through stack and plate materials within the fuel cell stack, especially around the plates of the stack. Hydrogen leaks into the cooling fluid channels where it is dissolved in the cooling fluid or is trapped in the cooling fluid as hydrogen bubbles. The hydrogen bubbles usually collect within a gas pocket within the cooling fluid reservoir.

It is necessary to remove the hydrogen from the gas pocket in the reservoir to prevent pressure build-up, as well as to eliminate the risk of potentially ignitable hydrogen concentrations. It is known to provide an air pump that pumps air into the gas pocket, where the existing air/hydrogen mixture within the gas pocket is vented from the reservoir through an outlet pipe. This operation removes the hydrogen gas from the reservoir, while maintaining the necessary gas pocket. However, by continually pumping air into the reservoir the cooling fluid within the reservoir may become contaminated with dirt and the like. Also, the air from the pump causes some of the cooling fluid to evaporate, which requires that the reservoir be filled from time to time. Further, the pump has to be heated so that it does not freeze in sub-zero environments. Also, the cooling fluid will degrade as a result of contact with oxygen. Further, the ventilation system requires complex electrical systems to guarantee the operation of the system for safety purposes. Additionally, because the coolant reservoir is open to the environment, there will be pressure differences between the anode and the cathode of the stack relative to the coolant loop that could reduce the lifetime of the stack.

SUMMARY OF THE INVENTION

In accordance with the teachings of the present invention, a fuel cell system is disclosed that employs a technique for safely removing hydrogen gas that accumulates within a cooling fluid reservoir. The fuel cell system includes a fuel cell stack and a compressor for providing airflow to the cathode side of the fuel cell stack. The system also includes an air filter box having an air filter that is in fluid communication with a gas pocket in the reservoir. The air intake to the compressor flows through the air filter box, and sucks the gas from the reservoir, which is then sent to the cathode side of the fuel cell stack to be converted to water by the electro-chemical reaction therein.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a fuel cell system that employs a technique for removing hydrogen gas from a cooling fluid reservoir is merely exemplary in nature, and is in no way intended to limit the invention or its applications or uses.

Figure 1:
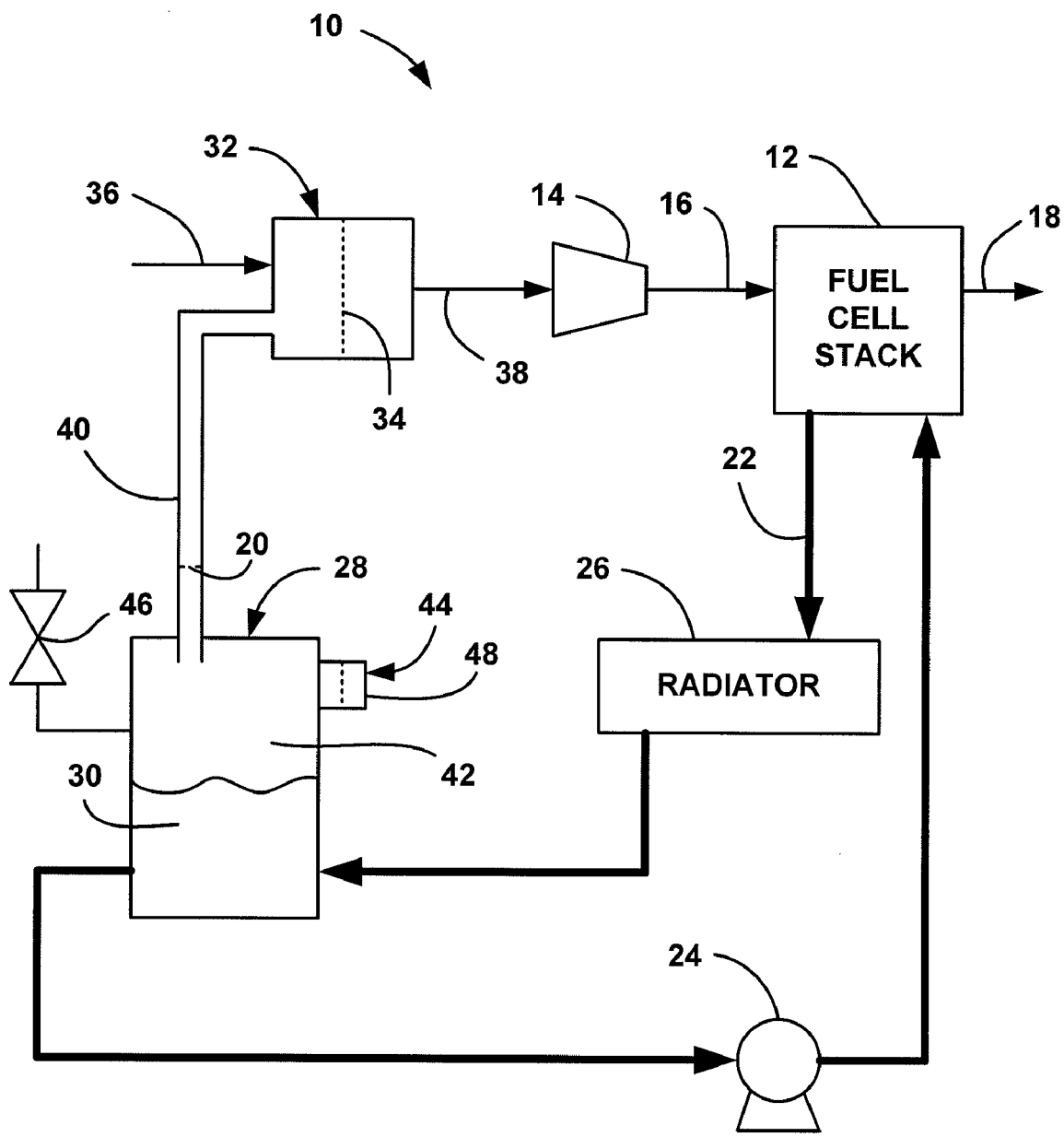
FIG. 1 is a schematic block diagram of a fuel cell system that employs a technique for safely removing hydrogen gas that accumulates within a cooling fluid reservoir, according to an embodiment of the present invention.

FIG. 1 is a schematic block diagram of a fuel cell system 10 including a fuel cell stack 12. The fuel cell system 10 includes a compressor 14 that provides a pressurized airflow to the cathode side of the fuel cell stack 12 on cathode input line 16. A cathode exhaust gas is output from the fuel cells tack 12 on cathode output line 18. The fuel cell system 10 includes a thermal sub-system that controls the temperature of the fuel cell stack 12. The thermal sub-system includes a coolant loop 22 through which a cooling fluid is pumped by a pump 24 and through the cooling fluid flow channels in the fuel cell stack 12. A radiator 26 is provided in the coolant loop 22 to reduce the temperature of the cooling fluid exiting the stack 12 so that it can be sent back to the stack 12 to again collect waste heat. The thermal sub-system includes a reservoir 28 in which is provided a supply of the cooling fluid 30 that compensates for cooling fluid losses and volume expansion of the cooling fluid as a result of changes in temperature.

The thermal sub-system further includes an air filter box 32 including an air filter 34. The airflow drawn by the compressor 14 flows through the air filter box 32 from air inlet line 36 to be sent to the compressor 14 on air line 38. The air filter box 32 is in gas communication with a gas pocket 42 in the reservoir 28 by a pipe 40.

As discussed above, a small amount of hydrogen gas leaks into the cooling fluid during normal system operation. Further, a larger amount of hydrogen may leak into the cooling fluid as a result of a failure, such as rupture of a seal, crack in a bipolar plate, etc. The hydrogen that accumulates within the cooling fluid eventually will flow into the reservoir 28, and collect in the gas pocket 42. During operation of the fuel cell system 10, the airflow through the air filter box 32 as a result of operation of the compressor 14 acts to suck or draw gas from the air pocket 42 through the pipe 40 and into the air filter box 32 to be combined with the cathode inlet air. This gas is then sent to the cathode side of the fuel cell stack 12 with the cathode inlet air, where the hydrogen therein is converted to water by the electro-chemical reaction at the cathode of the fuel cell stack 12. The maximum amount of gas that can be sent through the air filter box 32 from the reservoir 28 may be set by the diameter of the pipe 40 or an orifice 20 in connection with the speed of the compressor 14 so as to ensure that sufficient dilution of the hydrogen gas is below the hydrogen combustion limit when combined with the air in the air filter box 32. When the fuel cell system 10 and the compressor 14 are off, small amounts of residual hydrogen may be released into the air filter box 32. However, these small amounts of hydrogen are not considered hazardous.

The reservoir 28 can be a closed system where only gas that is captured in the gas pocket 42 is allowed to be released into the air filter box 32 as described above. Optionally, the reservoir 28 includes a vent 44 having a splash proof cover 48 that allows air to be drawn into the gas pocket 42 when the compressor 14 is drawing gas from the gas pocket 42 into the air filter box 32. Another option may be to provide an over-pressure relief valve 46 that is calibrated to a certain pressure within the air gap 42, which causes the release valve 46 to automatically open if the pressure level is exceeded. In this design, the gas, including hydrogen gas, would be vented to the atmosphere.

Figure 2:
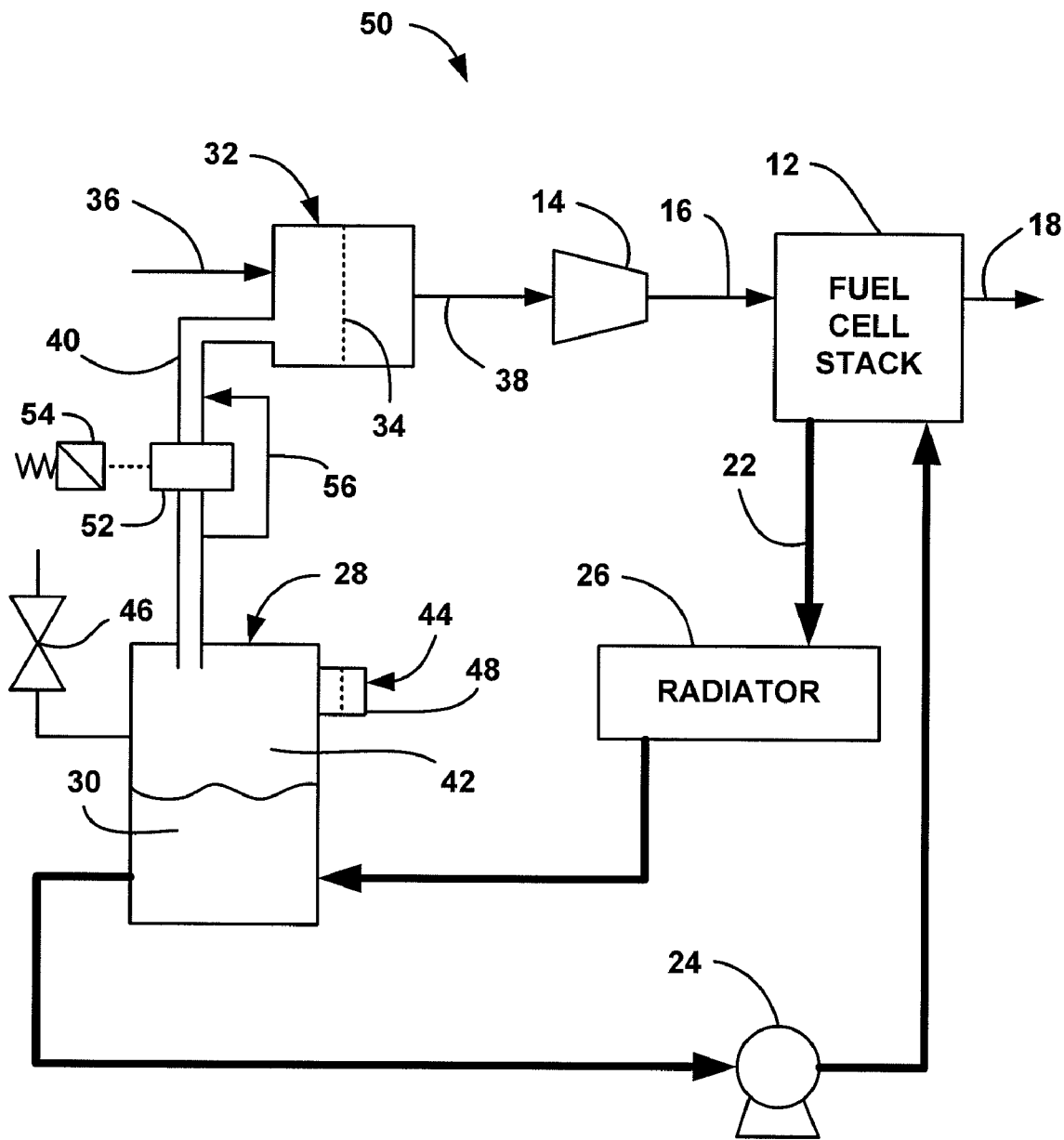
FIG. 2 is a schematic block diagram of a fuel cell system that employs a technique for safely removing hydrogen gas that accumulates within a cooling fluid reservoir, according to another embodiment of the present invention.

FIG. 2 is a schematic block diagram of a fuel cell system 50 similar to the fuel cell system 10, where like elements are identified by the same reference numeral. The system 50 includes an over-pressure/pressure regulation valve 52 in the pipe 40 that maintains the pressure in the reservoir 28 below a certain level. If the pressure within the reservoir 28 increases above the threshold level, the valve 52 automatically opens and releases the excess gas into the air filter box 32, which is drawn into the stack 12 as discussed above. A by-pass line 56 by-passes the valve 52 to allow the gas in the reservoir 28 to be drawn into the air filter box 32 during normal operation when the pressure in the reservoir 28 is below the limit that would open the valve 52.

The valve 52 can be equipped with a sensor 54 that detects when the valve 52 is open. Abnormal increases in pressure may be the result of abnormal temperature increases above the boiling point of the cooling fluid, or an excess release of hydrogen into the coolant loop 22 as a result of a failure. The detection of such failure modes from the sensor 54 may provide valuable information for the safety of the fuel cell system 50. Depending on the particular design of the valve 52 and the sensor 54, a quantitative or qualitative prediction of the amount of hydrogen released during an abnormal over-pressure occurrence can be determined.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell system comprising:
a fuel cell stack;
a compressor that provides a flow of cathode inlet air to a cathode side of the fuel cell stack;
a coolant loop in fluid communication with cooling fluid flow channels in the fuel cell stack, said coolant loop flowing a cooling fluid outside of the fuel cell stack that is recirculated back to the fuel cell stack;
a reservoir in fluid communication with the coolant loop, said reservoir including a supply of the cooling fluid and a gas pocket; and
an air box in gas communication with the gas pocket in the reservoir, wherein the air flow provided to the compressor is drawn through the air box by the compressor which acts to draw gas from the gas pocket in the reservoir and send it to the cathode side of the fuel cell stack.

2. The system according to claim 1 wherein the air box includes an air filter through which the cathode inlet air and the gas from the reservoir flow.

3. The system according to claim 1 further comprising a pressure regulation valve positioned within a pipe through which the gas flows from the reservoir to the air filter box, said pressure regulation valve being automatically opened if the pressure within the gas pocket in the reservoir increases above a predetermined threshold pressure.

4. The system according to claim 3 further comprising a sensor coupled to the pressure regulation valve, said sensor providing a signal when the pressure regulation valve opens.

5. The system according to claim 3 further comprising a by-pass line around the pressure regulation valve.

6. The system according to claim 1 wherein the reservoir includes an air inlet for allowing air to flow into the gas pocket.

7. The system according to claim 6 wherein the air inlet includes a splash proof cover.

8. The system according to claim 1 wherein the reservoir includes a pressure release valve in gas communication with the gas pocket, said pressure release valve releasing gas from the gas pocket if the pressure in the reservoir increases above a predetermined threshold pressure.

9. A fuel cell system comprising:
a fuel cell stack;
a compressor that provides a flow of cathode inlet air to a cathode side of the fuel cell stack;
a reservoir including a gas pocket; and
an air box in gas communication with the gas pocket in the reservoir by a pipe, wherein the air flow provided to the compressor is drawn through the air box by the compressor which acts to draw gas from the gas pocket in the reservoir and send it to the cathode side of the fuel cell stack.

10. The system according to claim 9 further comprising a pressure regulation valve positioned within the pipe, said pressure regulation valve being automatically opened if the pressure within the gas pocket in the reservoir increases above a predetermined threshold pressure.

11. The system according to claim 10 further comprising a sensor coupled to the pressure regulation valve, said sensor providing a signal when the pressure regulation valve opens.

12. The system according to claim 10 further comprising a by-pass line around the pressure regulation valve.

13. The system according to claim 9 wherein the reservoir includes an air inlet for allowing air to flow into the gas pocket.

14. The system according to claim 13 wherein the air inlet includes a splash proof cover.

15. The system according to claim 9 wherein the reservoir includes a pressure release valve in fluid communication with the gas pocket, said pressure release valve releasing gas from the gas pocket if the pressure in the reservoir increases above a predetermined threshold pressure.

16. A fuel cell system comprising:
a fuel cell stack;
a compressor that provides a flow of cathode inlet air to a cathode side of the fuel cell stack;
a coolant loop in fluid communication with cooling fluid flow channels in the fuel cell stack, said coolant loop flowing a cooling fluid outside of the fuel cell stack that is recirculated back to the fuel cell stack;
a reservoir in fluid communication with the coolant loop, said reservoir including a supply of the cooling fluid and a gas pocket reservoir, said reservoir further including an air inlet for allowing air to flow into the gas pocket; and
an air filter box in gas communication with the gas pocket in the reservoir by a pipe, said air filter box including an air filter, wherein the air flow provided to the compressor is drawn through the air filter box by the compressor which acts to draw gas from the gas pocket in the reservoir and send it to the cathode side of the fuel cell stack.

17. The system according to claim 16 further comprising a pressure regulation valve, said pressure regulation valve being automatically opened if the pressure within the gas pocket in the reservoir increases above a predetermined threshold pressure.

18. The system according to claim 17 further comprising a sensor coupled to the pressure regulation valve, said sensor providing a signal when the pressure regulation valve opens.

19. The system according to claim 16 wherein the air inlet includes a splash proof cover.

20. The system according to claim 16 wherein the reservoir includes a pressure release valve in fluid communication with the gas pocket, said pressure release valve releasing gas from the gas pocket if the pressure in the reservoir increases above a predetermined threshold pressure.

* * * * *